(No Model.) 6 Sheets—Sheet 1.
W. C. DOWNING.
TICKET PUNCH AND NUMBERING AND DATING DEVICE.

No. 588,322. Patented Aug. 17, 1897.

Witnesses:
Inventor.
William C. Downing.
By L. B. Coupland & Co
Attys

(No Model.)
6 Sheets—Sheet 2.

W. C. DOWNING.
TICKET PUNCH AND NUMBERING AND DATING DEVICE.

No. 588,322.  Patented Aug. 17, 1897.

(No Model.) 6 Sheets—Sheet 5.

W. C. DOWNING.
TICKET PUNCH AND NUMBERING AND DATING DEVICE.

No. 588,322. Patented Aug. 17, 1897.

Witnesses:
Inventor:
William C. Downing,
By L. B. Coupland & Co
Att'ys (No Model.) 6 Sheets—Sheet 6.
W. C. DOWNING.
TICKET PUNCH AND NUMBERING AND DATING DEVICE.
No. 588,322. Patented Aug. 17, 1897.

Witnesses:

Inventor:
William C. Downing,
By L. B. Coupland & Co
Attys

UNITED STATES PATENT OFFICE.

WILLIAM C. DOWNING, OF CHICAGO, ILLINOIS.

TICKET-PUNCH AND NUMBERING AND DATING DEVICE.

SPECIFICATION forming part of Letters Patent No. 588,322, dated August 17, 1897.

Application filed May 25, 1896. Serial No. 592,975. (No model.)

*To all whom it may concern:*

Be it known that I, WILLIAM C. DOWNING, a citizen of the United States, residing at Chicago, in the county of Cook and State of Illinois, have invented certain new and useful Improvements in a Ticket-Punch and Numbering and Dating Device; and I do hereby declare the following to be a full, clear, and exact description of the invention, such as will enable others skilled in the art to which it appertains to make and use the same.

This invention relates more especially to improvements in that class of devices used by railway-conductors and ticket-collectors in canceling tickets, and has for its object to provide a device of this character adapted to make a complete record of each ticket and cash fare collected for the purpose of guarding against and preventing fraudulent practices.

The invention consists in combining with the ordinary ticket-punch a feature whereby the ticket may be dated and numbered when collected in addition to the usual punch-cancellation.

Another feature provides for the recording of the cash fares received and the giving of a numbered receipt in the form of a hat-check to each passenger, showing the exact amount paid, the number on the receipt corresponding to the number of the ticket taken up.

Fig. 15, an elevation of a stationary locking-tumbler; Fig. 16, an elevation of one of the rotatable disks; Fig. 17, an elevation of one of the stationary washers placed between the lock-tumblers; Fig. 18, a detached perspective of a toothed plate forming a part of the locking mechanism; Fig. 19, an end elevation, the handles being omitted; Fig. 20, a detached elevation of a part of the dating-disk, and Fig. 21 a broken-away horizontal section on line 21, Fig. 1.

A is a hollow casing for supporting and inclosing the punching, printing, and locking mechanism. This casing or body of the device may be of any desired contour and is closed at the rear end by a removable cap A'. A receiving-chamber B is provided in the opposite closed end. The under side of the casing is provided with a rigid handle C and the upper part with a head D, in which is pivotally mounted a movable lever-handle E, carrying the punches F and G. The manipulating handle-lever is secured in its working position in the head part D by the fulcrum pivot-pin $a$. The inner end of this handle-lever is recessed in the punch F, as at $a'$, Figs. 1 and 2. The punch F is movably seated in the lower part of head D and rests below the ticket-slot $a^2$ when in its normal position. The hollow die member $a^3$ is fixed in the upper part of the head B above the ticket-slot and in line with the punch member. This feature provides for the usual punching of the tickets as they are collected, the ticket being inserted in the slot and the lever-handle closed down to the position illustrated in Fig. 2.

In the head part D and in the rear of the fulcrum-pivot of the lever-handle is movably inserted a second punch member G. This punch is provided with a slot-opening $b$ for the passage of the lever-handle therethrough. The hollow die member $b'$ for this punch is fixed in the upper part of the casing adjacent to the inner end and opens into the receiving-chamber B. The ticket to be punched is inserted in the slot $b^2$ and the handle-lever pressed down, which imparts a corresponding downward movement to the punch G.

An endwise-slidable plate $b^3$ moves in a horizontal plane and in its normal position projects across and closes the passage $b^4$ through the die member $b'$, so that the punched-out matter deposited in the receiving-chamber by the action of the punch cannot be surreptitiously removed therefrom through the passage in the die. This sliding plate is automatically actuated by means of its connection with the handle-lever, as will be next described.

The upper end of a cam-shaped arm 22 is secured in the casing by a pivot-pin 23 and passes down through a vertical slot 24 in the lever-handle. The lower end of this arm is loosely connected to the rear end of plate $b^3$ by a pin 25. It will be noted that the side walls 26 of the slot 24 through the handle-lever are rounded off so as to have a cam-like action on arm 22 in moving the lower end to its two positions. When the lever-handle is pressed downward toward its closing position, the lower end of arm 22 is forced backward and the sliding plate $b^3$ retracted to the position shown in Fig. 2, opening the passage through the die member to allow the cut-out portion of the ticket to drop into the receiving-chamber. The sliding plate and cam-shaped arm return to their normal position, Fig. 1, when the hand-pressure on the handle-lever is relaxed and it assumes its open position. The movement of the punch G and the sliding plate $b^3$ are so timed as not to interfere with each other.

A curved horizontal lever 27 is secured in its position in the casing by a fulcrum-pin 28, located at a point back of the inner end. The lower end of a spiral spring 29 is attached to the inner end of lever 27 and the upper end seated in a recess 30, formed in the under side of the lever-handle. This spring serves the purpose of automatically returning the handle-lever and actuating the punches and the horizontal lever 27 to the normal position when the closing-pressure on the former is relaxed. From its fulcrum lever 27 curves upwardly, in the manner shown, and has its rear end pivoted to an impression-plate 31, loosely suspended in place. This impression-plate operates in connection with the printing or numbering and dating mechanism, which will be described farther along.

The first punch, located in the extreme front end of the device, is intended for punching the tickets as they are collected and indicate the conductor's private punch-mark thereon, the punched-out parts not being preserved.

The second punch is more especially intended for use in collecting cash fares and the retaining of a complete record of the exact amount collected. A ticket or "hat-check," (not shown,) designed for use in collecting cash fares, will have dollars and fractions thereof printed on the ticket or hat-check and arranged in any convenient manner, so that the sum collected can be conveniently punched out. The part so punched out of the ticket will show the amount collected and will be deposited in the receiving-chamber.

The cash-fare ticket or hat-check may be of the double form or folder, the parts being exact duplicates, so that the sum punched out will be in duplicate. The ticket or check is then torn in two, each part numbered and dated, and one part handed to the passenger, which will be his receipt for the amount paid, and the other part retained by the conductor and turned into headquarters with the punch at the end of the run, when the cash-fare checks and the contents of the receiving-chamber can be compared.

A locking-pin 32 is rigidly inserted from the top of the casing and extends down through into the receiving-chamber. The course of this pin through the casing is indicated by dotted lines in Figs. 1 and 2. The upper part of this locking-pin is let into the pivot-pin 23 at one side, as shown at 33, Fig. 21. Farther down the locking-pin is let into fulcrum-pin 28 in the same manner, but not shown in the drawings. This feature is to prevent the endwise removal of pins 23 and 28 and guard against fraudulent access to the receiving-chamber at this point.

The printing mechanism for numbering and dating the tickets will next be described.

A stationary sleeve or hollow shaft 34 forms an integral part of the removable cap end $A'$ and is inserted longitudinally from the rear end of the casing. This sleeve forms an axis for the numbering or printing disks loosely mounted thereon in their working position. The numerals or other characters are arranged on the peripheries of the disks in the manner common to the general class of numbering and recording devices of different types, the general principle of operation being similar.

Figure 1:
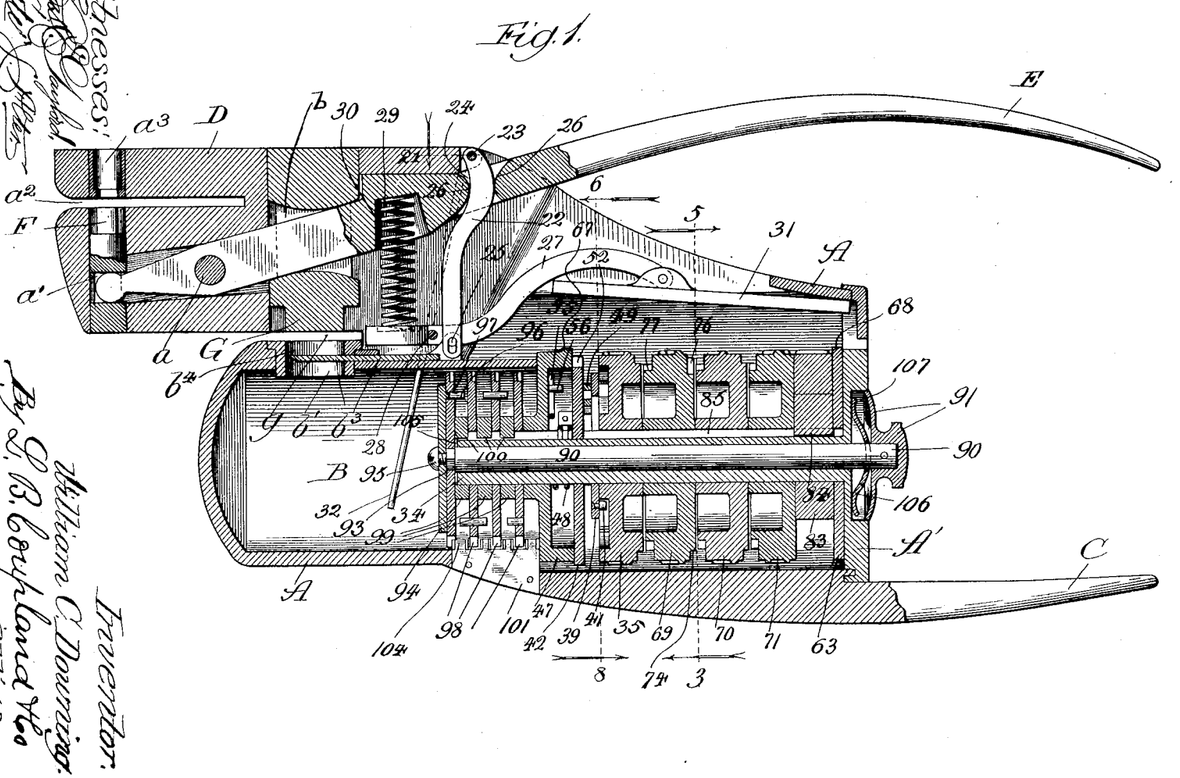
Figure 1 is an enlarged vertical longitudinal section and part elevation of a device embodying the improved features, the working parts being shown in their normal position.
Figure 2:
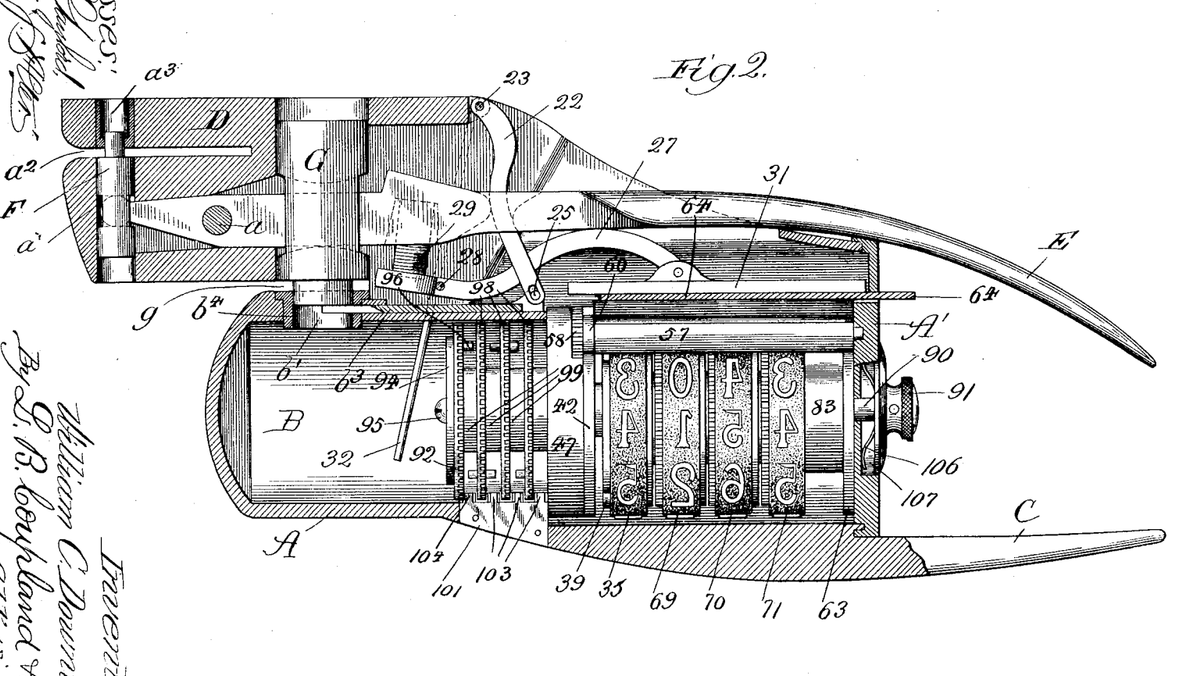
Fig. 2, a similar view, the working parts being shown in their opposite position.
Figures 6, 8, 9:
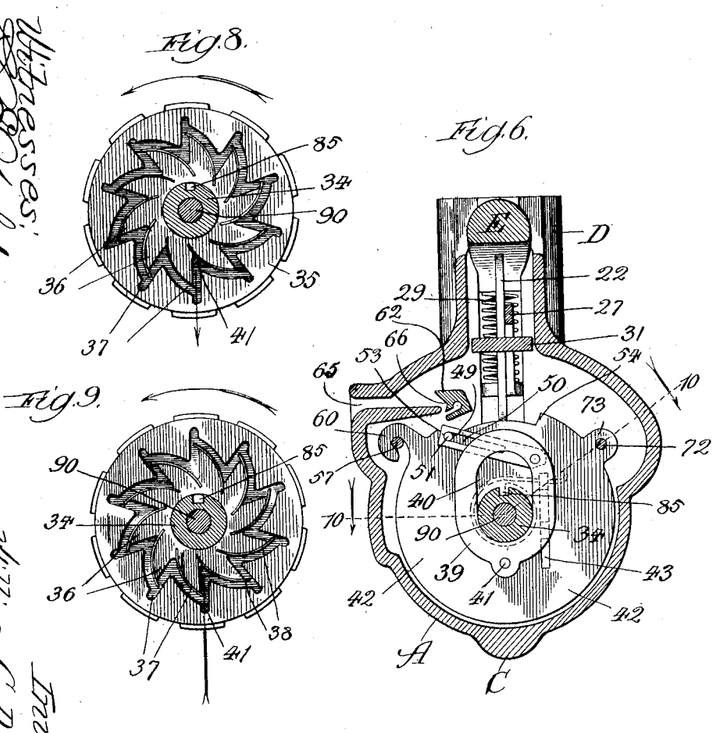
Fig. 6, a transverse section on line 6, Fig. 1, looking in the direction indicated.
Fig. 8, a transverse section on line 8, Fig. 1, showing an escapement used in operating the numbering-disks.
Fig. 9, a similar view showing the shifting-pin in its opposite position.
Figures 10, 11, 12, 13, 14:
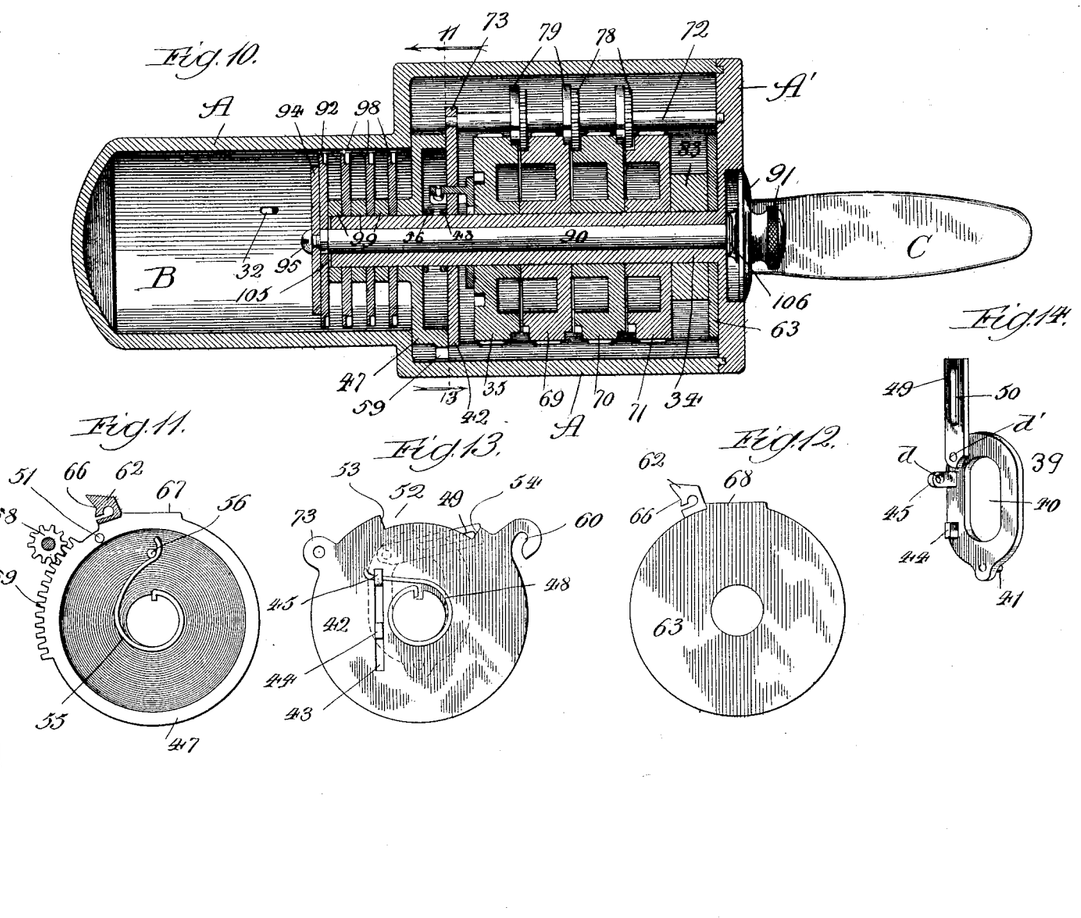
Fig. 10 is a longitudinal section on the angular line 10, Figs. 3 and 6.
Fig. 11, a transverse section on line 11, Fig. 10.
Fig. 12, a detached elevation of a circular plate loosely mounted on the axial sleeve.
Fig. 13, a transverse section on line 13, Fig. 10, looking in the opposite direction from that of Fig. 11.
Fig. 14, a detached detail.

The units-disk 35 is recessed or cut out on one side, Figs. 8 and 9, to form an integral escapement-wheel, with teeth 36 and the continuous zigzag groove 37 conforming to and following the contour of the teeth of the escapement. To the backs of the series of teeth are secured spring-plates 38, the outer ends of which project into the continuous groove. An elongated yoke 39, Fig. 14, having a corresponding opening 40, is loosely mounted on sleeve 34 and has an up-and-down movement thereon, the two positions of this yoke being shown in Figs. 6 and 7. This yoke lies close against the escapement side of the units-disk, as shown in Figs. 1, 2, and 10. A pin 41 is inserted in the lower end of the yoke and projects inwardly to engage with the teeth and spring-plates 38 of the escapement-wheel. When the yoke is in its lower position, the pin is in one of the bottom points of the continuous groove, as shown in Fig. 9, the arrows indicating the course of the pin. On the down movement of the yoke the pin 41 comes in contact with and passes by the projecting end of the spring-plate in position. On the up movement of the yoke the pin strikes the back of the spring-plate, and the units-wheel is rotated one figure for each upward impact of the shifting-pin. A circular plate 42, Figs. 1, 2, 6, and 7, is rigidly mounted on sleeve 34. This plate is provided with an elongated slot 43 in line with one side of the yoke which has the two lugs 44 and 45 formed thereon. The shorter lug 44 merely extends into the elongated slot and acts as a guide. The longer lug 45 projects through slot 43 into chamber 46 in disk-wheel 47 and is perforated, as at $d$, Fig. 14, for the insertion of one end of a wire spring 48, as shown in Fig. 13. This wire spring coils around the sleeve 34 and has its opposite end secured therein. The circular plate 42, as illustrated in Fig. 13, is shown in a reversed position from that of Figs. 6 and 7, the yoke being indicated by dotted lines on the opposite side.

One end of a link 49 is pivoted, as at $d'$, to yoke 39. The upper part of this link is provided with a slot 50. A pin 51 is inserted in the adjacent edge of disk-wheel 47, Fig. 11, which projects across the cut-away edge 52 of plate 42 and engages with the slotted end of link 49. The shoulders 53 and 54 form stops for the pin 51, which rides therebetween and limits the movements of these parts.

A spring 55 is located in the chambered side of disk-wheel 47 and encircles sleeve 34. One end of the spring is secured in said sleeve, the opposite extended end bearing against a pin 56, projecting from the adjacent surface of disk-wheel 47, as shown in Figs. 1 and 11.

Figures 3, 5:
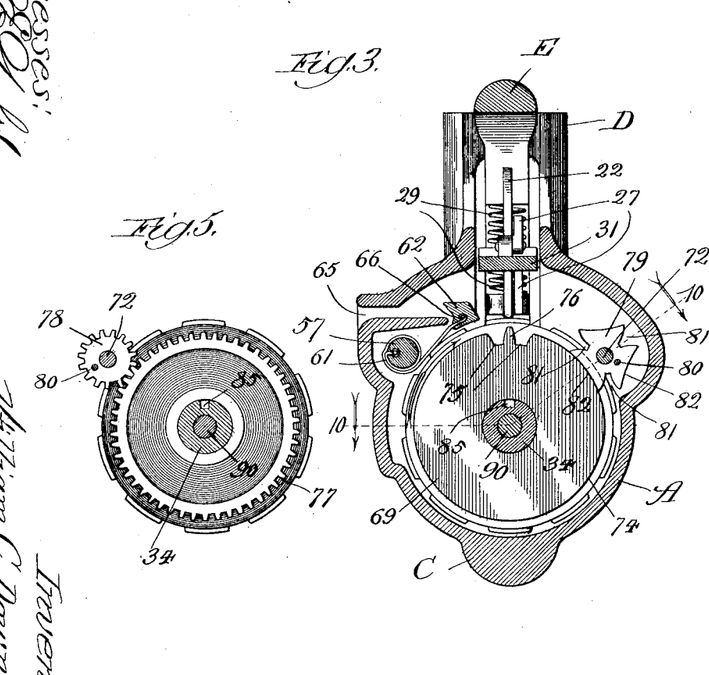
Fig. 3 is a transverse section on line 3, Fig. 1, looking in the direction indicated by the arrow, the working parts being in their normal position.
Fig. 5, a transverse section on line 5, Fig. 1, looking in the opposite direction from that of Fig. 3.
Figure 4:
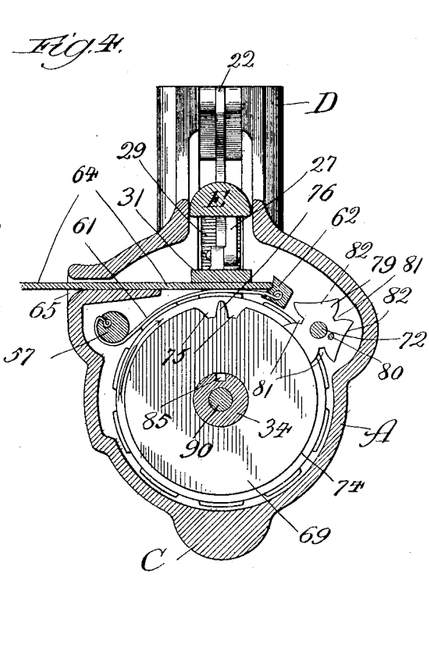
Fig. 4, a view taken on the same line, the working parts being shown in their opposite position.
Figure 7:
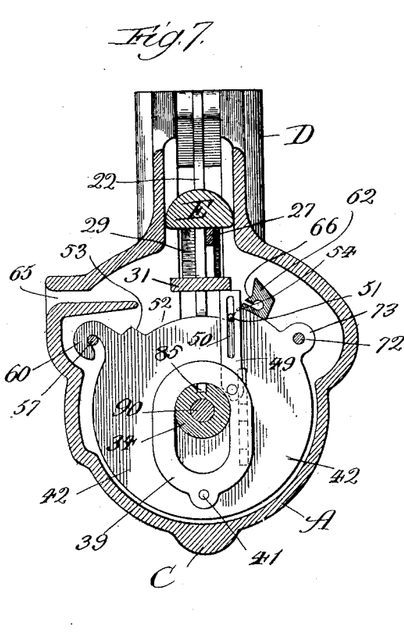
Fig. 7, a similar view as that of Fig. 6, the moving working parts being shown in their opposite position.

One end of an inking-roller 57, Figs. 2, 3, 4, and 11, is journaled in the cap end of the case, the opposite end having a pinion 58 mounted thereon which engages with the gear-teeth 59, formed on the periphery of disk-wheel 47 and extending but part way therearound. The circular plate 42 is provided with a hook projection 60, engaging with the inking-roller just back of its driving-pinion, and serves to retain the roller and plate in their proper relative position. The inking-ribbon 61, Figs. 3 and 4, is wound on roller 57 and has one end attached thereto, the opposite end being attached to a bar 62, which runs parallel with the inking-roller. One end of the bar 62 is secured to a circular plate 63, loosely mounted on the outer end of the sleeve 34, next to the removable cap end of the case. The opposite inner end of the bar 62 is secured to disk-wheel 47. The ticket 64 to be operated upon by the numbering or printing mechanism is inserted through a slot 65 in the casing and comes in contact with the face of the bar 62, provided longitudinally with a groove 66, and is thereby prevented from slipping over the top of the same. A light pressure from the ticket on the bar 62 forces the same over to the position shown in Fig. 4, which movement rotates the inking-roller, unwinds the ribbon, and brings it into position over the printing-characters. The rotary movement of the inking-roller imparts a corresponding movement to the disk-wheel 47 through the medium of pinion 58 on the roller engaging with gear-teeth on said disk-wheel. The movement of the disk-wheel in turn moves the link 49 from its inclined normal position (shown in Fig. 6) over to the vertical position (shown in Fig. 7) by means of the pin 51 of the disk in engagement with the slotted end of the link and traversing the cut-out edge of the circular plate 42. When the lever-handle is being compressed into the closed position, (shown in Fig. 7,) it comes in contact with the fulcrum-lever 27, which in turn forces down the impression-plate 31 onto the ticket, to which the imprint is transferred. The closing of the lever-handle also brings the impression-plate in contact with the link 49 after it has assumed its vertical position and forces it downwardly and carries along with it the yoke 39 to the opposite position from that of normal, as shown in Fig. 7. The position of the pin 41 in the lower end of the yoke now corresponds with its position in Fig. 9. Figs. 6 and 8 show the opposite or normal position of pin 41. When the closing-pressure on the lever-handle is relaxed, it is thrown into its open normal position by its spring 29, the downward tension of the spring also restoring the fulcrum-lever 27, carrying the impression-plate to its normal position. Simultaneously with this movement the spring 48 returns the yoke 39 to its normal position, which movement brings pin 41 in contact with the escapement-teeth in the units-wheel and imparts a single impulse thereto. Simultaneously with the return movement of the yoke the spring 55, chambered in the disk-wheel 47, turns said wheel back to its normal position, at the same time rotating the inking-roller, winding up the ribbon through the medium of the gear-and-pinion connection before described. The link 49 is also returned to its inclined normal position at the same time by means of its pin connection with the disk-wheel 47.

The respective ends of the impression-plate 31 are adapted to come to a stop-bearing on the raised flat surface 67, Fig. 11, on disk-wheel 47 and the corresponding surface 68 on the disk-plate 63, Fig. 12. These flat surfaces are a little higher than the surface of the printing-characters on the series of numbering-disks and prevents the impression-plate from having contact with and injuring the same when only the punch part of the device is being used.

The disk-wheel 47 and the disk-plate 63 are connected by the bar 62 and are thereby adapted to have a simultaneous rotary movement when the end of a ticket is pressed against said bar, and by the time the ticket has entered far enough to be operated upon the disk-wheel 47 and the disk-plate 63 have rotated far enough to carry the high flat places thereon out of the way of the printing mechanism.

It will be understood that all the different parts have a simultaneous action with the movement of the lever-handle.

The units-wheel 35 is the first in the series and is moved one figure between each impact. Next the tens-disk 69 comes into action coincident with the units-disk, when the figures on the latter are exhausted, next the hundreds-disk 70, and then the one-thousand disk 71, in regular order of succession, using as many numbering-disks in the series as the character of the work may require.

The means employed for transmitting motion from one disk to the next in order of arrangement will be described next.

A shaft 72, Figs. 3, 4, 6, 7, and 10, has its outer end journaled in the cap end A', the inner or opposite end being journaled in a lug 73, formed on the circular stationary plate 42. Each of the numbering-disks except the last one of the series is cut away clear around on the forward side, so as to provide an annular shoulder 74 of a less diameter than that of the disk, as shown in Figs. 3 and 4. This shoulder is recessed on one side, as at 75, and is provided in this recess with a tooth 76, which projects a little beyond the line of the shoulder. The adjacent surface of the next numbering-disk is provided with the integral toothed gear-wheel 77, which is also of a less diameter than that of the disk proper, as illustrated in Fig. 5.

On shaft 72, Figs. 5 and 10, are mounted pinions 78, which are in engagement with the gear-wheel part of the different numbering-disks. Locking-tumblers 79 are also mounted on shaft 72 and are secured to the respective pinions by a pin 80. The locking-tumblers have three equal sides, with a recess 81 between each, as shown in Figs. 3 and 4. The bearing sides are curved out, as at 82, to conform to the periphery of the annular shoulder 74, with which one of the sides is always in contact.

The operation is as follows: When the units-disk has made one revolution, the tooth 76 comes in contact with the adjacent side of the locking-tumbler, bearing on the annular shoulder 74, and imparts a rotary movement to the tumbler and brings the next side into a locking position when the tooth shall have passed on out of contact. The tumbler imparts a corresponding motion to the adjacent pinion, which in turn moves the tens-disk one figure at the proper time, and so on throughout the series. A dating-disk 83, Figs. 1, 2, 10, and 20, is mounted on the sleeve 34 in a stationary position, the inner edge being provided with a tongue 84, Fig. 20, engaging with a groove 85, running lengthwise of the sleeve and locking the dating-disk against a rotary movement. This disk is provided with a recessed projection 86, with which the extension 87 on the dating-block engages. A screw 88 inserted through a lug 89 bears against the dating-block on the opposite side and holds the same in its working position. This provides for the convenient insertion and removal of different dating-blocks as may be required from time to time.

The lock attachment will next be described.

Figures 15, 16, 17, 18, 19, 20, 21:
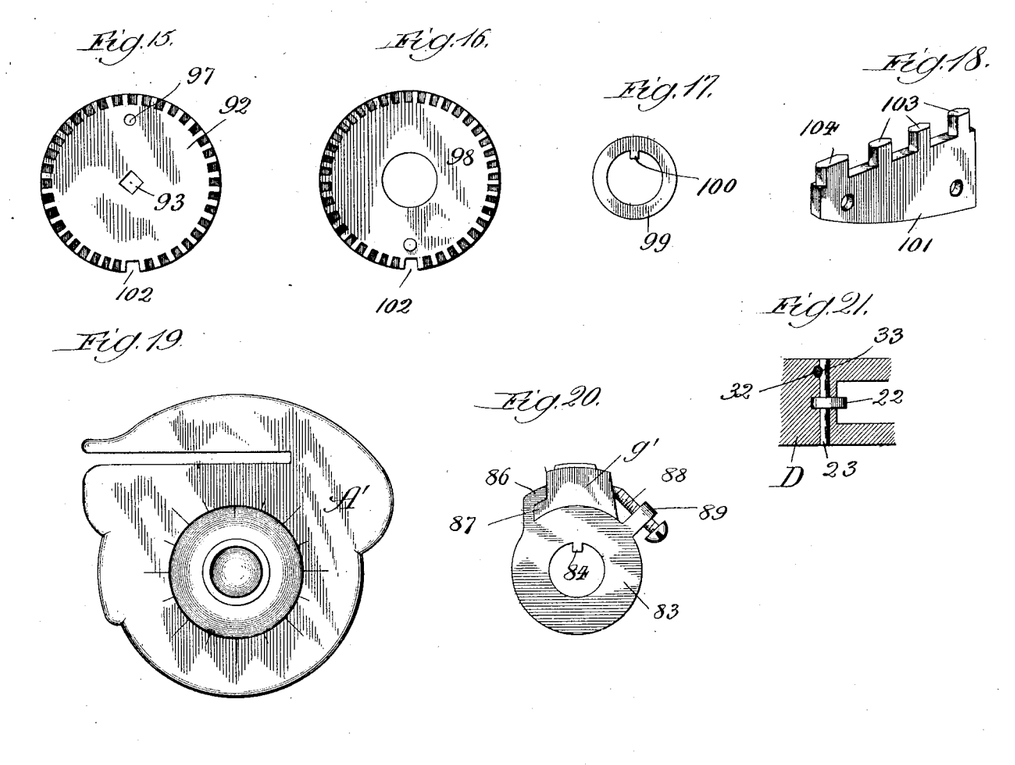

A spindle 90 is inserted longitudinally through the sleeve 34 and has a knob 91 mounted on the outer end thereof. The first tumbler 92, Fig. 15, has a square aperture 93 therethrough and is mounted on the correspondingly square inner end of the spindle 90, Figs. 1 and 10. A disk-plate 94 is rigidly secured to the inner end of the spindle by a screw 95. This plate is provided with a pin 96, which projects through an aperture 97 in tumblers 92 and secures the two together in a working position. The rest of the series of tumblers 98, Fig. 16, are loosely mounted on sleeve 34 and are retained in their proper relative position by division-washers 99, Fig. 17, mounted on the sleeve 34, between each of the tumblers, and locked against a rotary movement by a lip 100 engaging with the longitudinal groove in the sleeve. A toothed plate 101, Fig. 18, is secured in a proper relative position with reference to the tumblers, so that the end cap and printing mechanism can only be removed when the notches 102 in the edges of the tumblers are all brought into line with the teeth 103 of the plate 101. The wider tooth 104 prevents the turning of the first tumbler, which normally is in contact therewith, until the spindle has been forced inwardly by a pressure on knob 91, when the tumbler 92 will clear the wider tooth 104 and may be rotated. Neither can the spindle be drawn outward far enough for the first tumbler to clear the wider tooth, as the other tumblers will come in contact with their respective teeth. A space 105, Fig. 1, is provided for between the inner end of the axial sleeve and the adjacent surface of the first tumbler. Thus the first tumbler bears against its division-washer instead of against the end of the sleeve and exerts a pressure against the washers and tumblers by reason of the outward pressure of the spring 106, seated in a recess 107 in the cap end, bearing against the knob end of the spindle. Thus the spindle is returned to its normal position by the action of the spring when the pressure on the knob is relaxed and the tumblers prevented from turning when the printing and locking mechanism is removed from the case. The cap end is provided with the usual indicating dial-face, as shown in Fig. 19. This arrangement combines and embodies in one structure all the different features necessary to retain a complete record of a run and prevent fraudulent practices, as access cannot be had to the inclosed parts except by those having knowledge of the lock combination.

At the end of the trip the punch is turned in with the collected tickets and cash fares and the record compared.

Having thus described my invention, what I claim as new, and desire to secure by Letters Patent, is—

1. The combination with the inclosing casing, provided with a head part, of an operating handle-lever, pivoted in the head part, a curved horizontal lever fulcrumed in the inclosing case, an impression-plate, pivoted to one end of the horizontal lever, a spring, for retaining the handle-lever and horizontal lever in their proper relative position, and the printing mechanism, substantially as described.

2. The combination with the handle-lever, of the punch-dies, secured to and actuated thereby, a horizontal lever, having an upwardly-curved part, the handle-lever being adapted to come in contact with the curved part on its downward movement, an impression-plate, pivoted to the horizontal lever and adapted to have contact with an object when compressed, a spring, connecting the handle-lever and curved horizontal lever and automatically returning these parts to their normal position when the pressure on the handle-lever is relaxed, and the printing mechanism, substantially as described.

3. The combination with the inclosing casing, of a removable cap end provided with an integral sleeve extending inwardly therefrom, the printing-wheels, loosely mounted on said sleeve, the means described, for imparting a rotary movement to said wheels in their order of succession, and the mechanism for locking said removable cap end and printing mechanism in place, substantially as described.

4. The combination with the axial sleeve, inserted longitudinally in the casing, of the units-disk, comprising in its structure an escapement-wheel recessed in one side thereof, a yoke, having an up-and-down movement on said sleeve and provided with a pin engaging with said escapement and transmitting an intermittent rotary movement to said units-wheel, the circular plate, rigidly mounted upon said sleeve adjacent to the yoke, and having a slot therein through which guide-lugs on the yoke project, a disk-wheel, loosely mounted on said sleeve, the wire spring, connected at one end to said yoke-lug and the other to said sleeve, the link, having an elongated slot in one end and pivoted to said yoke, a pin, projecting from said disk-wheel and extending across the cut-away edge of said circular plate and engaging with the slotted end of said link, the impression-plate and the handle-lever, whereby a rotary movement of said disk-wheel will move said link into a vertical position when the impression-plate, coming in contact therewith, will force the same downward together with the yoke, and the spring for returning these parts to their normal position, substantially as described.

5. The combination with the casing, of an inking-roller, journaled therein, the disk-wheel, having teeth formed on a part of its periphery, the pinion, mounted on said inking-roller and engaging with said teeth, the circular plate, loosely mounted upon the axial sleeve adjacent to the removable cap end, a bar connecting said disk-wheel and said plate, and the inking-ribbon, having one end secured to said roller and the other end to said bar, whereby a ticket inserted will have contact with said bar and force the same over to its opposite position, unwinding the ribbon and rotating the said disk-wheel, and the spring, returning the parts to their normal position when the ticket is withdrawn, substantially as described.

6. In a device of the class described, the combination with the impression-plate, of a disk-wheel, provided with a raised flat surface, a disk-plate, provided with a corresponding flat surface, adapted to receive the contact of the respective ends of said impression-plate and prevent it from having contact with the printing-characters when there is no ticket inserted, the bar, connecting said disk-wheel and disk-plate, the printing-wheels, and the inking mechanism therefor, substantially as described.

In testimony whereof I affix my signature in presence of two witnesses.

WILLIAM C. DOWNING.

Witnesses:
 L. M. FREEMAN,
 L. B. COUPLAND.